April 11, 1961 F. A. KROHM 2,979,426
WINDSHIELD WIPER ARM ASSEMBLY
Original Filed March 26, 1954 2 Sheets-Sheet 1
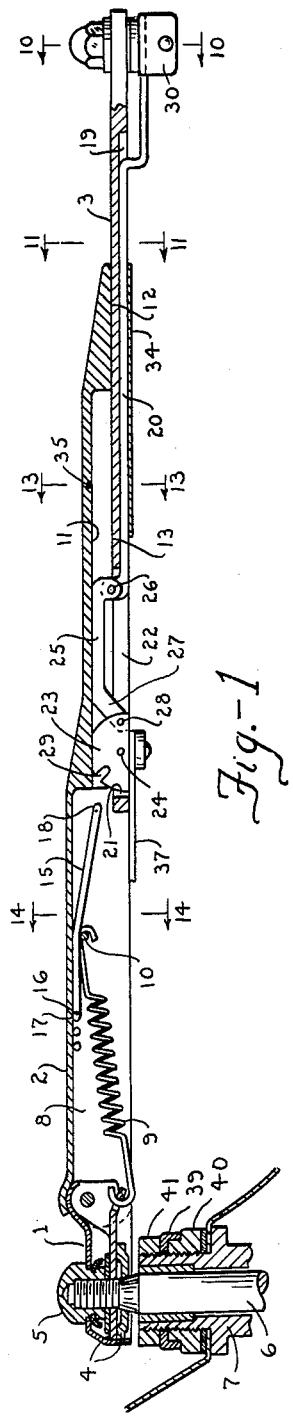
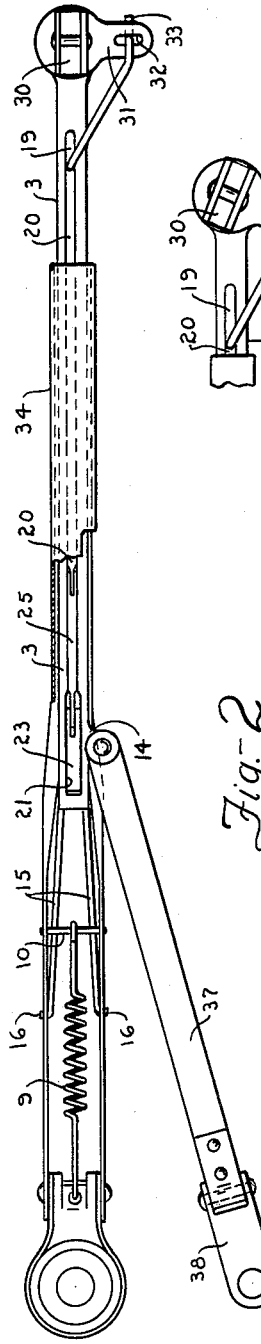
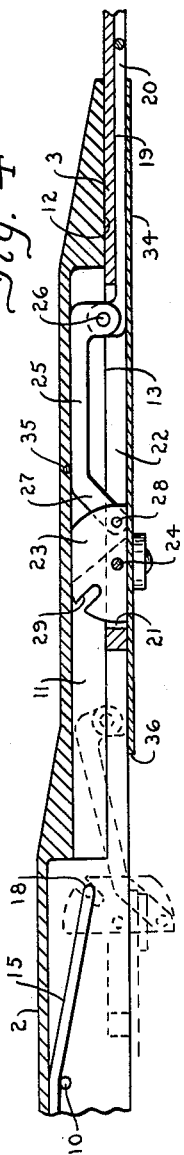
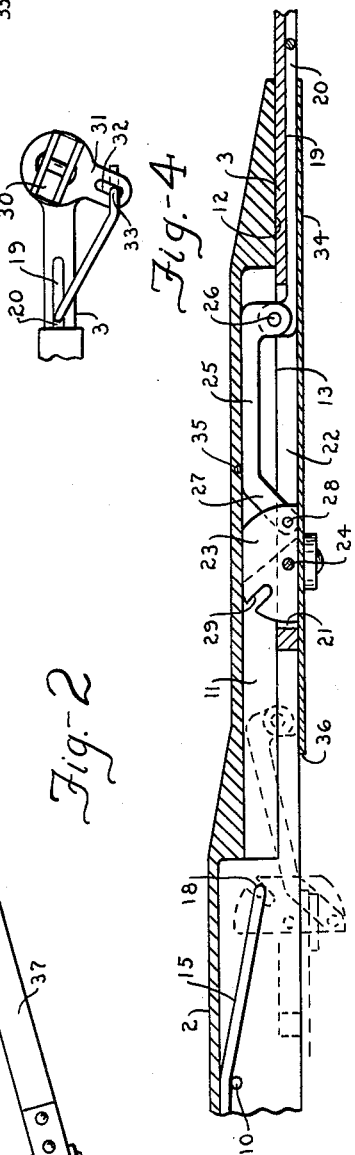
INVENTOR.
FRED A. KROHM
BY
Charles L. Penfold
ATTORNEY

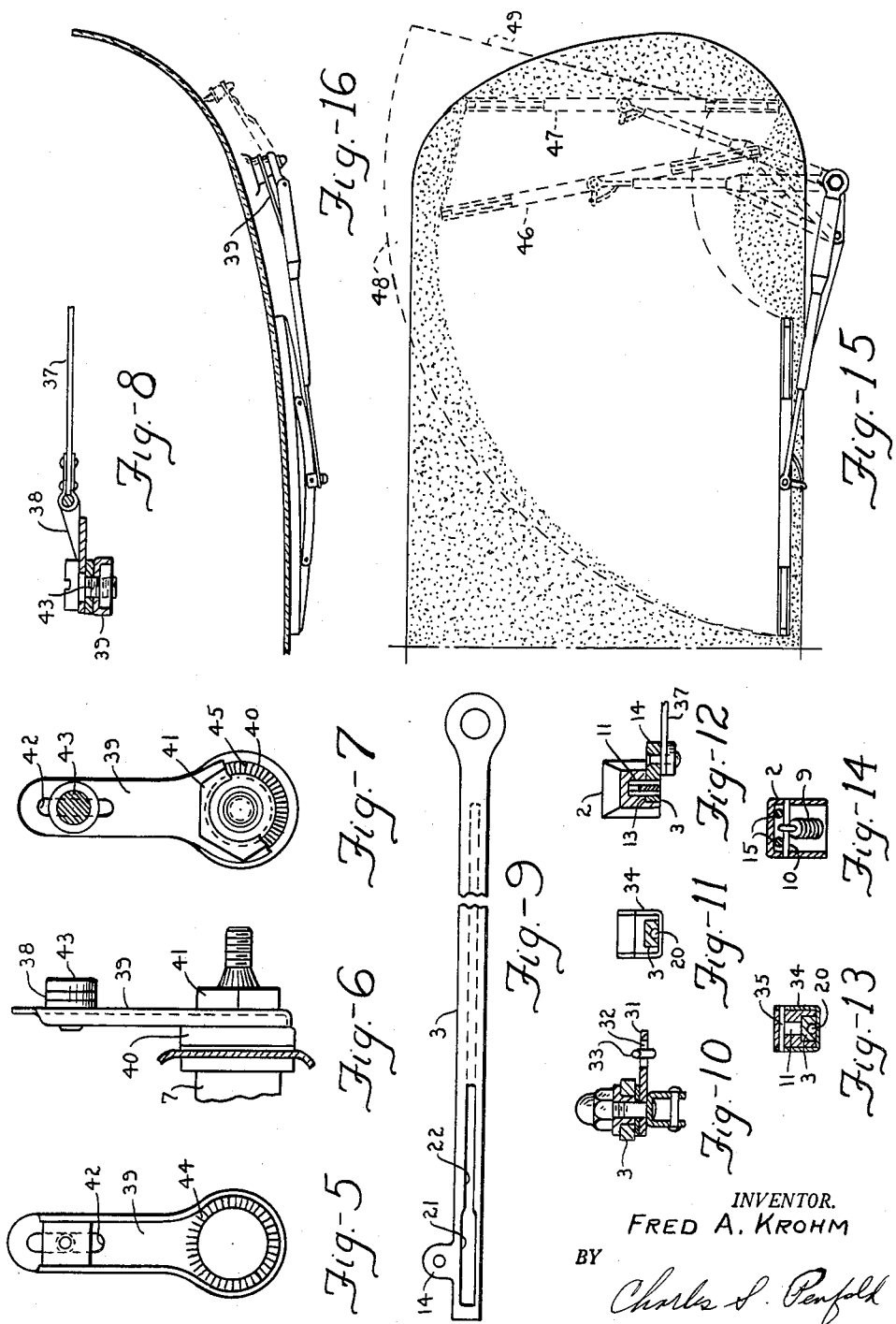

United States Patent Office 2,979,426
Patented Apr. 11, 1961

2,979,426
WINDSHIELD WIPER ARM ASSEMBLY

Fred A. Krohm, Hobart, Ind., assignor to The Anderson Company, a corporation of Indiana Original application Mar. 26, 1954, Ser. No. 418,932. Divided and this application Jan. 24, 1958, Ser. No. 710,925

4 Claims. (Cl. 134—6)

This invention relates generally to windshield wiper devices and more particularly is directed to a wiper arm and/or combination of an arm assembly with a wiper blade and a movement-modifying arm to provide an improved system or method of wiping a curved surface.

The windshields of automotive vehicles are being made longer and with curved rearwardly extending extremities or wings to promote vision and styling. In the trade, windshields of this character are referred to as the wrap-around type.

The design of windshield structures now provided on some vehicles has advanced to an extent where conventional wipers are incapable of satisfactorily cleaning certain areas of a windshield particularly at or adjacent the curved wings. Some areas due to the narrow width and extreme curvature of the glass are not wiped at all by a conventional wiper. In fact a conventional wiper blade operating through a true arc in approaching a wing will leave the windshield so that a portion of the blade will extend into space and/or beyond the edges of the windshield in which event only a small part of the wing is cleaned. This condition results in poor visibility and, therefore, is detrimental to safe driving.

With the foregoing in mind, one of the principal objects of the invention is to provide a unique method of utilizing wiper apparatus comprising a wiper blade-carrying arm with means for reciprocating and pivoting the blade with respect to the longitudinal axis of the arm so that the blade will be caused to readily conform to a particular portion of the windshield to be wiped.

More specifically, the arrangement is such that the blade, during a complete stroke in one direction from a parked position, will progressively move toward the drive shaft supporting the wiper arm, and as the blade approaches the wing portion of the windshield it will be pivoted with respect to the arm so as to reach and wipe a prescribed area which could not be wiped by a blade restricted for movement in a true arc by conventional apparatus. In other words, the invention offers a means whereby the blade, during its oscillation across the windshield, will be caused to pivot with respect to the arm only at a predetermined location as the blade also moves toward and away from the drive shaft supporting the wiper arm.

More particularly an object of the invention is to provide a novel method utilizing apparatus comprising, among other things, a primary arm having an inner section for attachment to a drive shaft, an intermediate section pivotally connected to the inner section and an extensible or slidable outer section provided with a pivotal connector for supporting a blade; a secondary or movement-modifying arm having one end pivoted to the extensible section of the primary arm and its other end arranged for attachment to a pin on a mounting so that when the primary arm is oscillated across a windshield by the drive shaft the extensible section and blade carried by the connector thereon will reciprocate lengthwise with respect to the inner and intermediate arm sections.

Other objects and advantages of the invention will become apparent after the description hereinafter set forth is considered in connection with the drawings annexed hereto.

In the drawings:

Figure 1 is a longitudinal section of the primary arm structure and also shows the mode of connecting it to a drive shaft;

Figure 2 is a bottom view showing the operative relationship of the primary arm and secondary or movement-modifying arm;

Figure 3 is a partial enlarged longitudinal sectional view of the primary arm structure and illustrates the action which takes place when an actuator on the arm is moved into engagement with an abutment means on the arm;

Figure 4 is a partial bottom view of the primary arm structure and shows that the connector for supporting the blade is pivoted with respect to the extensible arm section when the actuator is operated by the abutment means;

Figure 5 is a bottom view of a fitting which is employed to facilitate connection and adjustment of the secondary arm with respect to a bearing which supports the drive shaft;

Figure 6 is a view with a portion in section for the purpose of depicting the manner in which the fitting is attached to the bearing;

Figure 7 is a front view of the assembly shown in Figure 6 with portions in section to illustrate details of construction;

Figure 8 is a longitudinal view which illustrates the manner in which the secondary arm is connected to the fitting;

Figure 9 is a top view of the extensible arm section;

Figure 10 is a sectional view taken substantially on line 10—10 of Figure 1 illustrating the details of the operative relationship between the connector for supporting the blade and the extensible arm section;

Figure 11 is a transverse section taken substantially on line 11—11 of Figure 1;

Figure 12 is a transverse section taken through an appropriate part of the apparatus depicting details of construction;

Figures 13 and 14 are transverse sectional views respectively taken on lines 13—13 and 14—14 of Figure 1;

Figure 15 is a front view of a windshield showing the different positions of the wiper apparatus and wiper blade associated therewith; and Figure 16 is a partial longitudinal sectional view taken through a windshield showing different positions of the arm structure and wiper blade.

This application is a division of my copending application Serial No. 418,932, filed March 26, 1954.

Referring more particularly to the drawings, the primary arm above referred to includes, among other things, an inner section 1, an intermediate section 2 pivotally connected to the inner section, and an extensible or outer section 3 slidably mounted on the intermediate section.

The inner arm section of the primary arm is preferably provided with a pair of relatively movable clutch members 4 and a nut 5 for detachably securing the arm in any one of a number of predetermined fixed positions on a drive shaft 6, the latter of which is rotatably supported in a mounting 7 which extends through the cowl of a vehicle body.

The intermediate section 2 of the primary arm is preferably formed to provide an elongate chamber 8. A helical spring 9 is housed within this chamber and one end of the spring is connected to one of the clutch members on the inner section and its other end to a cross pin 10 on the intermediate section for urging the intermediate and outer arm sections as a unit toward a windshield. The intermediate section is further preferably provided with an elongate recess 11 and a groove 12 of a depth somewhat less than the depth of the recess. The recess is formed with a longitudinal extending shoulder 13 which in effect constitutes a continuation of the base wall of the groove 12. A portion of one side of the intermediate section is preferably removed to provide clearance for an integral lug 14 on the extensible arm section and a bearing therefor, the bearing being disposed in the same plane as the shoulder 13 and the base wall of the groove 12 so that substantially continuous track means are provided for the extensible section.

The intermediate section 2 is further provided with yieldable abutment means preferably in the form of an elongate generally U-shaped spring having legs 15 with offset ends 16 which project outwardly into a pair of holes 17 provided therefor in the side walls of the intermediate section. The spring is interposed between the base wall of the chamber and the cross pin 10 to locate a bridge portion 18 connecting the legs 15 in a predetermined position adjacent the inner end of the recess 11. The abutment means may be constructed in other ways than as herein illustrated, but the one shown offers a setup whereby its offset ends may be detachably received in more than one pair of holes in the intermediate section as illustrated so that the bridge portion 18 may be located in different positions for a purpose which will be described subsequently.

The extensible arm section 3 is preferably provided with a longitudinally extending groove 19 in its underside for slidably receiving a connecting rod 20. As clearly shown in Figures 3 and 9 the extensible section is further provided with an elongate generally rectangular opening 21 in its inner end and an adjacent opening 22 located between the opening 21 and the groove 19. An actuator 23 is pivotally mounted in the rectangular opening 21 by means of a pivot 24 extending through the bottom central portion of the actuator and through the extensible section. A link 25 is disposed in the opening 22 and has its forward end pivotally connected by a pin 26 to the connecting rod 20 and its rear offset end 27 to the forward lower corner portion of the actuator by a pin 28. It will be noted that the forward end of the actuator is preferably bifurcated and that the pin 28 extends transversely therethrough including the link and that the outer end of the link is similarly provided with a bifurcation which receives the inner end of the connecting rod 20, the pin 28 extending transversely through the rod and bifurcation. It will be noted that the pivotal connections between the actuator, extensible section and link are located in the plane of the extensible section and that the connection between the link and rod is located in a different plane so as to obtain, among other things, a desirable leverage action. The actuator is further preferably provided with rounded or bevelled end portions and a notch 29 which is adapted to receive the bridge portion 18 of the abutment means as shown in Figure 3 and in a manner which will be explained subsequently.

A connector 30 is pivotally mounted on the free end of the extensible section. This connector may be designed and constructed as desired, but as herein illustrated preferably includes a channel and a cross pin which are adapted to cooperate with a suitable attachment provided on a wiper blade. The connector is provided with an offset constituting a link 31 which is arranged at an obtuse angle with respect to the longitudinal axis of the connector. The end of the link is provided with a slot 32 and the connecting rod is angled from the extensible section and provided with an upturned offset 33 which slides in the slot when the blade is pivoted with respect to the longitudinal axis of the primary arm by the connecting rod through the agency of the actuator.

A cover 34 in the form of an elongate channel is detachably connected to the underside of the intermediate arm section and, among other things, serves to hold the extensible section and connecting rod operatively associated with one another with the extensible section nesting in the intermediate section and the connecting rod in the extensible section for guiding purposes and to reduce the over-all thickness of the primary arm. It will be noted that the extensible section and connecting rod actually slidably bear on the cover. The cover may be detachably secured to the intermediate section by any suitable means but as herein shown a pin 35 extends through the side walls of the cover and through the intermediate section. It will be noted that an inner portion of the cover is cut away so as to provide clearance for the lug 14 extending outwardly from the inner end of the extensible arm section. It should be further noted that the inner end 36 of the cover as shown in Figure 3 terminates at a predetermined location with reference to the bridge portion 18 of the abutment means.

It is to be understood that it is not necessary that the major portion of the connecting rod nest in the extensible arm section because if found desirable it may be located between the lower surface of the extensible section and the upper surface of the bottom wall of the cover 34. Also, in some instances, it may be desirable to locate the connecting rod in a groove disposed in the upper side of the extensible section or between the upper surface of this section and the base wall of the groove 12 in the intermediate section. Furthermore, means other than a cover such as 34 may be utilized to hold the extensible section and connecting rod in operative relationship with respect to one another and the intermediate arm section.

The arrangement above described is preferably such that when the extensible arm section is moved inwardly a sufficient distance the inner rounded end of the actuator will engage the bridge portion 18 of the spring, and when the extensible section is moved further inwardly the rounded end of the actuator will engage and cam the spring back until the bridge portion 18 moves into the notch 29, whereupon the actuator is released from the inner end 36 of the cover to permit the actuator and link 25 to take the dotted-line positions exemplified in Figure 3 when the extensible section is caused to travel inwardly still further. When the extensible section is moved outwardly the rounded forward end of the actuator will cam against the bridge portion 18 of the spring and cause the actuator to pivot back to the full-line position illustrated in Figures 1 and 3. Whenever the actuator is operated by the spring the connecting rod 20 causes the connector 30 and blade carried thereby to pivot with respect to the longitudinal axis of the extensible arm section.

It is to be understood that means other than a cover may be employed to determine when the actuator 23 is allowed to pivot when engaged by the bridge 18 of the spring or abutment means. Moreover, it is to be understood that provision may be made to cause the actuator to pivot at more than one location during the travel of the extensible section with respect to the intermediate section so as to actuate the connecting rod to pivot the blade at predetermined areas of the windshield.

Attention is directed to the important fact that the actuator cannot be pivoted while it is confined for movement by the cover. In other words, the actuator cannot be pivoted to reciprocate the connecting rod so that the latter will pivot the blade until the actuator clears the inner end 36 of the cover. This setup positively assures that the blade will not be pivoted with respect to the longitudinal axis of the arm until the arm reaches a predetermined position during its travel across a windshield.

As depicted in Figures 2, 7 and 8, the secondary or movement-modifying arm includes, among other things, an elongate arm 37 and a link 38. The outer end of the arm 37 is pivotally connected to the lug 14 on the extensible section of the primary arm and the link 38 is pivotally connected to the inner end of the secondary arm 37. The link is preferably adjustably connected to an elongate fitting 39, the inner enlarged end of which is preferably detachably connected to the drive shaft mounting 7 by and between a pair of nuts 40 and 41 threaded on the mounting. The outer end of the fitting is provided with a slot 42 through which the shaft 43 of a bolt assembly extends so that the link 38 may be adjustably secured to the fitting for the purpose of varying the travel of the extensible section of the primary arm which carries the wiper blade. The inner enlarged end of the fitting is provided with an aperture through which the threaded portion of the drive shaft mounting extends and is further provided with serrations 44 which cooperate with corresponding serrations 45 preferably provided on the upper end or surface of the nut 40 to firmly secure the fitting in place after adjustment. With this arrangement, the travel of the extensible arm can be varied to suit different installation requirements. The adjustments between the link and fitting and between the fitting and the shaft mounting all contribute toward control of the extensible arm section. The fact that the complete apparatus is supported on the drive shaft and mounting therefor also facilitates installation.

In view of the foregoing, and referring to Figures 15 and 16 of the drawing, the wiper apparatus is shown in a parked position and in different operative positions. When the blade is moved upwardly and toward the right the blade will take the path shown by the unshaded area. More specifically in this regard, the blade is held against pivotal movement until it reaches or approaches the dotted-line position 46 at the beginning of the bent wing portion of the windshield, and as it swings further over to position 47 the movement-modifying arm gradually pulls the extensible arm section inwardly, and as the actuator 23 clears the inner end 36 of the cover the bridge 18 of the abutment means will ride into the notch 29 of the actuator to operate the actuator and thereby pull the connecting rod 20 inwardly to pivot the blade so that the blade will substantially wrap itself around a portion of the wing of the windshield. The blade will traverse the same path on its return movement. In addition to wiping a windshield at the places described, the blade is prevented from banging against the windshield frame.

The importance of the invention is perhaps best exemplified in Figure 15 where the blade, if mounted for movement through a true arc in the conventional way, would cause the blade to travel the path indicated by the dotted lines 48 and cause at least a portion of the blade to swing off the windshied into space as indicated by the dotted-line position 49.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. The method of wiping a windshield having a convex surface comprising oscillating an elongate wiper blade-and-arm assembly transversely of its length along the convex surface of the windshield about a fixed axis while progressively varying the distance between the wiper blade and said fixed axis throughout a predetermined stroke of oscillation and angularly adjusting the wiper blade relative to the arm in a path substantially parallel to the surface of the windshield through an outer portion only of said stroke of oscillation.

2. The method of wiping a windshield having a convex surface comprising oscillating an elongate wiper blade-and-arm assembly transversely of its length along the convex surface of the windshield about a fixed axis while progressively varying the distance between the wiper blade and said fixed axis throughout a predetermined stroke of oscillation and angularly adjusting the wiper blade relative to the arm in a path substantially parallel to the surface of the windshield through at least a portion of said stroke of oscillation.

3. The method of wiping a windshield having a convex surface comprising oscillating an elongate wiper blade transversely of its length along the convex surface of the windshield about a fixed axis while progressively varying the distance between the wiper blade and said fixed axis throughout its stroke of oscillation and angularly adjusting the wiper blade, as it moves through an outer portion only of said stroke of oscillation, relative to a straight line joining said fixed axis and a predetermined fixed point on said blade.

4. The method of wiping a curved windshield having a frontal portion and a wing portion comprising oscillating an elongate wiper blade transversely of its length along the curved surface of the windshield about a fixed axis while progressively varying the distance between the wiper blade and said fixed axis throughout its stroke of oscillation and angularly adjusting the wiper blade, as it moves over said wing portion of said windshield, relative to a straight line joining said fixed axis and a predetermined fixed medial point on said blade.

References Cited in the file of this patent

UNITED STATES PATENTS

| | | |
|---|---|---|
| 2,185,572 | Sawyer | Jan. 2, 1940 |
| 2,691,186 | Oishei | Oct. 12, 1954 |
| 2,775,780 | Pisano | Jan. 1, 1957 |

FOREIGN PATENTS

| | | |
|---|---|---|
| 1,032,359 | France | Mar. 25, 1953 |